United States Patent [19]

Koike et al.

[11] 3,947,767
[45] Mar. 30, 1976

[54] MULTILEVEL DATA TRANSMISSION SYSTEM

[75] Inventors: Shin'Ichi Koike; Hiroshi Fujimoto, both of Tokyo, Japan

[73] Assignee: Nippon Electric Company, Limited, Tokyo, Japan

[22] Filed: Sept. 25, 1974

[21] Appl. No.: 509,171

[30] Foreign Application Priority Data

Sept. 27, 1973 Japan................ 48-108842

[52] U.S. Cl.................... 325/38 A; 178/68
[51] Int. Cl.$^2$.......................... H04B 1/62
[58] Field of Search............... 325/38 A; 178/68

[56] References Cited
UNITED STATES PATENTS 3,829,779   8/1974   Fujimoto............ 325/38 A Primary Examiner—George H. Libman
Attorney, Agent, or Firm—Sughrue, Rothwell, Mion & Zinn

[57] ABSTRACT

An improved multilevel code transmission system for transmission of a data signal in the form of an N-level code signal based on a partial response shaping employs a special differential coding prior to partial response shaping on the transmitter side and, on the receiver side subsequent to partial response decoding, a differential decoding corresponding to the differential coding. The system is characterized in that each pair of input, parallel binary codes is so arranged that only the most significant bit is different from each other and the remaining bits are represented by the same binary codes, and in that only the most significant bit is affected by the differential coding and decoding.

11 Claims, 9 Drawing Figures

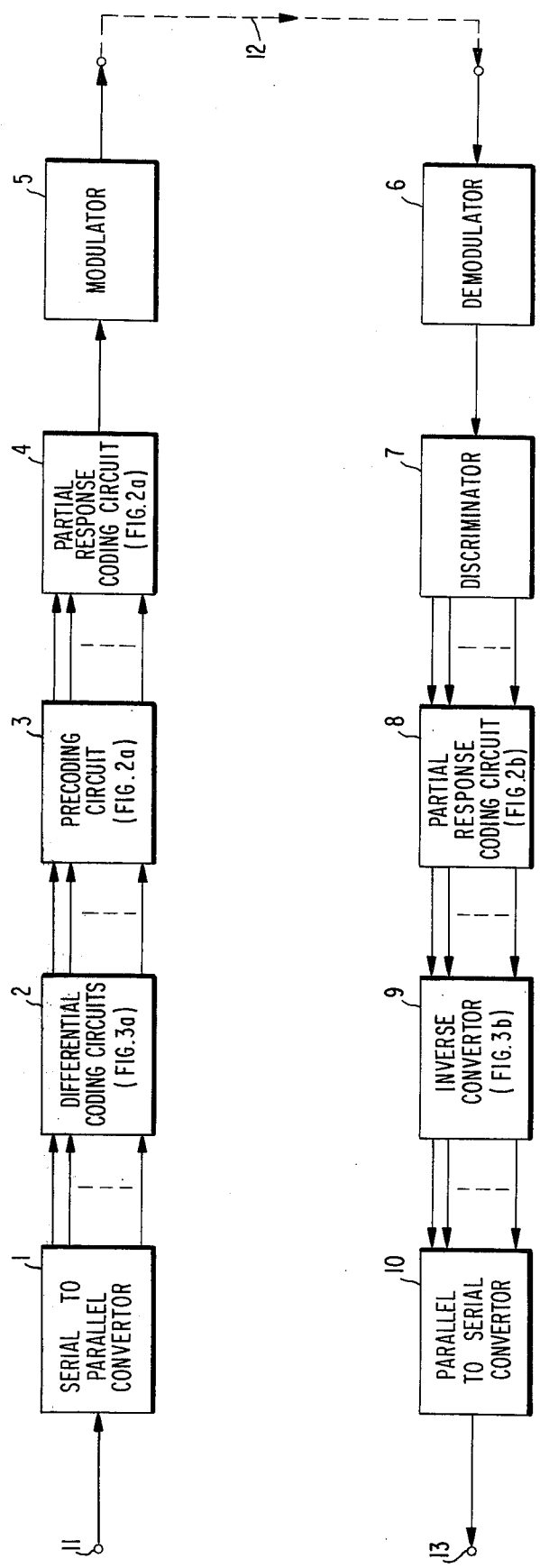

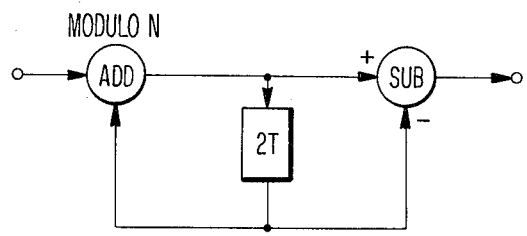
FIG.2a PRIOR ART
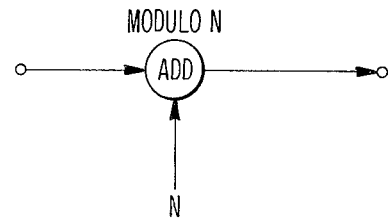
FIG.2b PRIOR ART
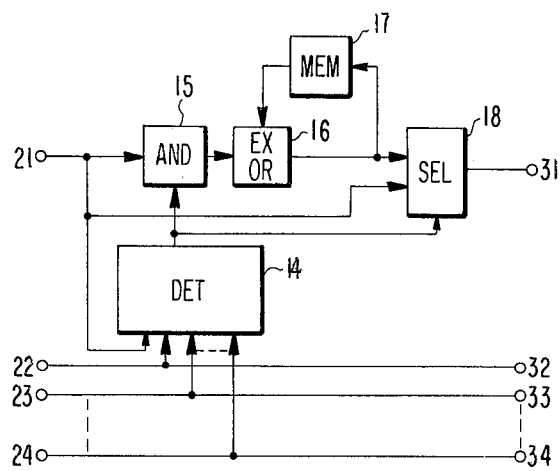
FIG. 3a
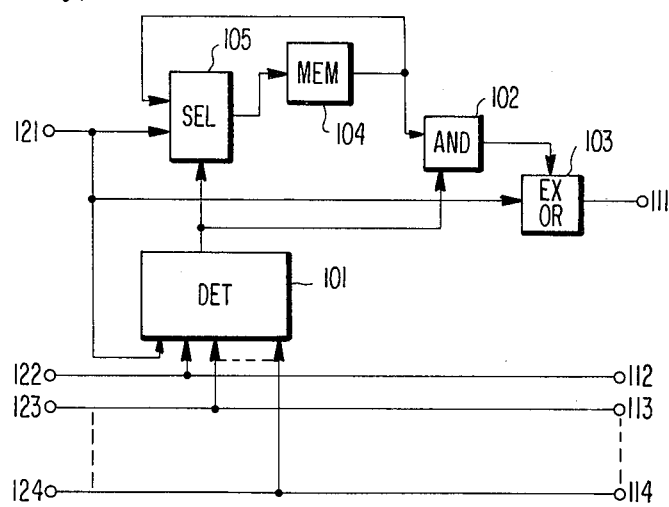
FIG. 3b
| SYMBOL | (MSB) $B_1$ | $B_2$ | $B_3$ | ---------- | $B_{m-1}$ | (LSB) $B_m$ |
|---|---|---|---|---|---|---|
| $S_{N-1}$ | 1 | 1 | 1 | ---------- | 1 | 1 |
| $S_{N-2}$ | 1 | 1 | 1 | ---------- | 1 | 0 |
| S | 1 | 1 | 1 | ---------- | 0 | 1 |
| ⋮ | ⋮ | ⋮ | ⋮ | ⋮ | ⋮ | ⋮ |
| $S_3$ | 0 | 1 | 1 | ---------- | 0 | 1 |
| $S_2$ | 0 | 1 | 1 | ---------- | 1 | 0 |
| $S_1$ | 0 | 1 | 1 | ---------- | 1 | 1 |
| $S_0$ | 0 | 0 | 0 | ---------- | 0 | 0 |
FIG 4

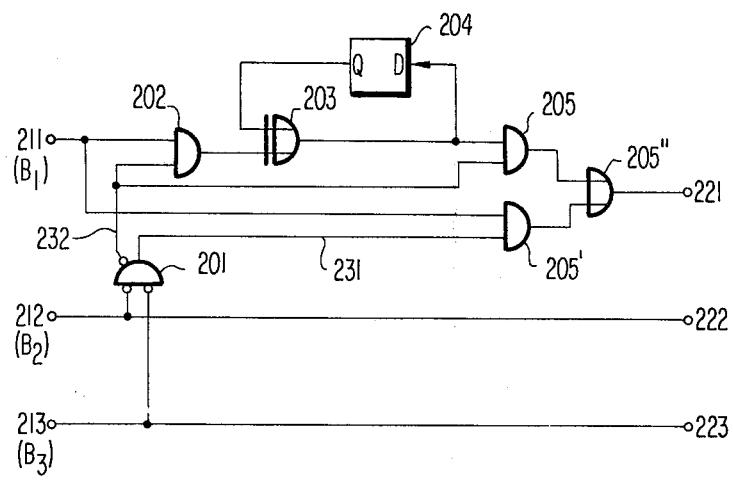
FIG. 5a
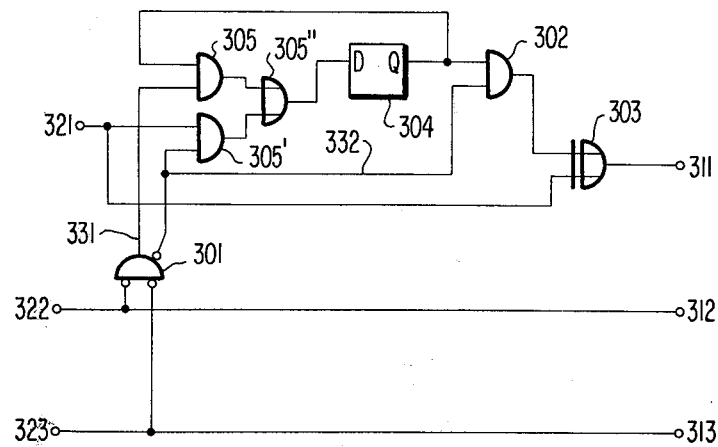
FIG. 5b
FIG. 6
| SYMBOL | (MSB) B₁ | B₂ | (LSB) B₃ |
|---|---|---|---|
| $S_7$ | 1 | 1 | 1 |
| $S_6$ | 1 | 1 | 0 |
| $S_5$ | 1 | 0 | 1 |
| $S_4$ | 1 | 0 | 0 |
| $S_3$ | 0 | 0 | 1 |
| $S_2$ | 0 | 1 | 0 |
| $S_1$ | 0 | 1 | 1 |
| $S_0$ | 0 | 0 | 0 |

MULTILEVEL DATA TRANSMISSION SYSTEM

BACKGROUND OF THE INVENTION

1. Field of the Invention

The present invention relates to a multilevel data transmission system employing the so-called class IV partial response shaping.

2. Description of the Prior Art

As an introduction to the description of the present invention, an outline of a coder and a decoder based on the partial response shaping of the (1, 0, −1) format will be explained with reference to the drawings. FIG. 1(a) is a diagram of a fundamental coder structure based on the partial response shaping of the (1, 0, −1) format (hereinafter referred to simply as "partial responsne shaping"), and FIG. 1(b) is a diagram of a fundamental decoder structure for use with the same shaping technique. In these figures is illustrated a case of 2N−1 kinds of levels (N being an integer not smaller than 3). More particularly, in the coder of the transmitter side, input signals consisting of N kinds of symbols $S_0, S_1, \ldots S_{N-1}$ are subjected to modulo-N addition with its output signals as delayed by 2T (T being a clock time period for data transmission). The resultant output signals are further modulo-N substraction with said output signals as delayed by 2T. Accordingly, the output signals of the substractor may possibly have 2N−1 kinds of levels −(N−1), −(N−2), . . . −1, 0, 1, . . ., (N−1). In the receiver-side decoder shown in FIG. 1(b), these signals are subjected to modulo−N addition with a number N. In this data transmission system, since a symvol Si ($i = 1, 2, \ldots N-1$) of the input signals on the transmitter side corresponds to either level $i$ or level $-(N-i)$ in the transmitter output, the decoding can be performed easily, and upon occurrence of an error in code during transmission the error would not propogate on the receiver side.

With regard to the above-outlined partial response shaping of the (1, 0, −1) format, reference should be made to the following publications:

1. "A New Signal Format For Efficient Transmission" by F. K. Becker, E. R. Kretzmer and J. R. Sheehan, *B.S.T.J.* Vol. XLV, NO. 5, pp. 755–758;
2. "Generalization of a Technique for Binary Data Communication" by E. R. Kretzmer, *IEEE Trans. Comm. Tech.*, 1966, pp. 67–68; and
3. "Multilevel Partial-Response Signalling" by A. M. Gerrish and R. D. Howson, ICC '67 Record 19CP67–1181, p. 186.

In such a partial response shaping, (1) in the case of transmitting a multilevel signal in the form of a base band signal, it should be taken into consideration whether or not the signal polarity is inverted in an amplifier and the like, while (2) in the case of transmitting a multilevel signal in the form of a band-limited amplitude-modulation signal, the polarity of the base band signal after demodulation may be possibly inverted owing to the fact that the phase of a demodulated carrier wave for use in synchronous detection is shifted by 180°. With respect to the case (2) above, it is a common practice in the VSB or SSB receiver to provide a phase control circuit for demodulated carrier waves such that a quadrature component in the demodulated base band signal may be maintained at zero. However, it is well-known that in such a case the phase of the demodulated carrier wave may be possibly shifted by 180°. If the polarity of the multilevel signal is inverted in this way, the partial response shaping results in level $i$ of the transmitter output being received as level $(-i)$ whose demodulated symbol is $S_{N-i}$, and thus level $i$ and level N−$i$ are no longer identical to each other except for level O if N is an odd number, or except for symbols 0 and N/2 if $N$ is an even number. Similarly, in the case where level $-(N-i)$ has been transmitted after partial response shaping in response to a transmitter input symbol Si, lelvel N−$i$ would also be received owing to polarity inversion, resulting in demodulation of symbol $S_{N-i}$, and thus the data cannot be transmitted correctly. In this way, upon occurrence of polarity inversion, symbol Si would be always mistaken for symbol $S_{N-i}$. However, the above-referred symbbols $S_O$ and $S_{N/2}$ are transmitted correctly even upon occurence of polarity inversion. In other words, it can be seen that symbols $S_i$ and $S_{N-i}$ form a symbol pair which would be incorrectly transmitted upon occurrence of polarity inversion, where $i$ is a positive integer smaller than N/2.

SUMMARY OF THE INVENTION

One object of the present invention is to provide a multilevel code transmission system employing a partial response shaping, in which transmission and reception of a data signal can be carried out correctly even if the above-referred polarity inversion should occuur.

In the coding system according to the present invention, on the transmitter side, prior to partial response shaping, special differential coding is performed, while on the receiver side, subsequent to partial response decoding, differential decoding corresponding to said differential coding is performed.

BRIEF DESCRIPTION OF THE DRAWINGS

Now the present invention will be described in more detail with reference to the accompanying drawings, wherein:

FIG. 1 is a block diagram of a multilevel code transmission system according to the invention;

FIGS. 2 (a) and 2(b) are block diagrams of a coder and a decoder, respectively, employing a partial response shaping;

FIGS. 3(a) and 3(b) are block diagrams of a differential coder and differential decoder, respectively, according to the present invention;

FIG. 4 is a transformation table showing the relation between the input symbols and the input signals in FIG. 3;

FIGS. 5(a) and 5(b) are logic circuit diagrams of a differential coder and a differential decoder, respectively, as applied to 15-level partial response shaping, which forms one preferred embodiment of the present invention; and FIG. 6 is a transformation table showing the relation between the input symbols and the input signals in FIG. 5.

DESCRIPTION OF THE PREFERRED EMBODIMENT

Referring to FIG. 1, the data to be transmitted is supplied in the form of a binary signal to a serial to parallel converter 1 via an input terminal 11. The converter 1 converts this signal into parallel binary signals in the number corresponding to the number of levels N of the multilevel signal. The parallel binary signals are treated in a differential coding circuit 2 and supplied through a precoding circuit 3 to a partial response coding circuit 4, which comprises multilevel pulse generators, whereby a base band signal is formed. This base band signal is subjected, for example, to AM-SSB modulation in a modulator 5. The modulator 5 superposes a necessary pilot signal on the modulated signal and supplies its output to a transmission channel 12. A demodulator 6 performs the coherent detection of the signal transmitted over the channel 12 and obtains the base band signal. A discriminator 7 discriminates each digit of the base band signal with respect to its level among (2N−1) numbers of levels. The resultant signal is decoded into a multilevel signal of N-levels by a partial response decoding circuit 8 which, as described, performs modulo-N summation of the signal and N. This multilevel signal is converted into a binary signal by a parallel to serial converter 10 via an inverse converter circuit 9 for the differential coding operaion. The binary data signal is an output to be supplied through a terminal 13 to a terminal device. Circuits 2, 3, 4, 8 and 9 will be further described below by referring to FIGS. 2 and 3. Other circuits are not further described since the operations of these circuits are apparent from the foregoing description regarding the partial response system, as well as from the prior art in transmission circuits.

Now referring to FIGS. 3(a) and 3(b), these coders and decoders deal with binary-coded symbols, which are represented, for example, as shown in FIG. 4. It is to be noted that in this example $N = 2^m$ is employed. In this example, symbol $S_i$ ($i = 1, 2, \ldots, N-1$) corresponds to $m$ combinations of binary codes each consisting of parallel $m$ bits, which may be either a parallel input of $m$ kinds of data signals or a version of each set of $m$ bits in one kind of data in a parallel $m$ bit code, or else which may be a version of an input data signal in combined parallel-series form. What is important in FIG. 4 is to establish a correspondence between the symbols and the binary codes in such manner that between symbol Si and symbol $S_{N-i}$ only the most significant bit (MSB) or B1 is different and the other bits are represented by the same binary codes. This provision is possible even in a general case where the form of $N = 2^m$ is not valid, and binary coding having such a nature is not limited to that illustrated in FIG. 4.

In FIG. 3, reference numerals 21, 22, 23 and 24 designate respectively the input terminals for receiving binary bits $B_1$ (MSB), $B_2$, $B_3$ and so on, Bm (LSB) input terminals; and 31–34, the corresponding output terminals of the coder. Reference numeral 14 designates a code detector, which can detect symbols other than $S_0$ if N is an odd number, or symbols other than $S_0$ and $S_{N/2}$ if N is an even number. Numeral 15 designates an AND gate; 16, an exclusive-OR circuit; and 17, a one-bit memory circuit, these component elements performing the known differential coding with respect to MSB only in the case where the input symbol is neither $S_0$ nor $S_{N/2}$ as referred to above. Reference numeral 18 designates a selector circuit which selects as its output the input $B_1$ (MSB) per se if the input symbol is either $S_0$ or $S_{N/2}$ as referred to above, and the differentially coded MSB if the input symbol is neither $S_0$ nor $S_{N/2}$ as referred to above. When the input symbol is neither $S_0$ or $S_{N/2}$ as referred to above, the AND gate 15 is closed to feed a logic "0" to the exclusive-OR circuit 16, so that the content of the memory circuit 17 is preserved without any change.

In FIG. 3(b), reference numeral 101 designates a code detector; 102, an AND gate; 103, an exclusive-OR circuit; 104, a one-bit memory circuit; and 105, a selector circuit which performs code transformation inverse to the transmitter code depending upon whether or not the receiver input symbol is either $S_0$ or $S_{N/2}$ as referred to above. Though this decoder includes a feedback path, it is interrupted if a symbol other than $S_0$ and $S_{N/2}$ as referred to above is applied to the decoder as an input symbol, and therefore, a code error on the transmission path would never circulate indefinately within the decoder.

In the differential coding system as described above, symbols $S_i$ and $S_{N-i}$ are differentially coded in pairs, respectively. Accordingly, upon carrying out partial response coding and decoding, even if symbol $S_i$ should be mistaken for symbol $S_{N-i}$ owing to polarity inversion on the transmission path, they could be transmitted correctly. Since the symbols $S_0$ and $S_{N/2}$ inversion, they need not be differentially coded.

A differential coder and a differential decoder to be applied to a 15-level data transmission system using partial response shaping (the above-described example having a number of $N = 8 = 2^3$) which constitutes one preferred embodiment of the present invention, are illustrated in FIGS. 5(a) and 5(b), respectively. In this case, 8 symbols are made to correspond to binary codes $B_1$, $B_2$ and $B_3$ as shown in FIG. 6. As seen in FIG. 6, symbols $S_1$ and $S_7$, $S_2$ and $S_6$, and $S_3$ and $S_5$, respectively, form pairs wherein each member within a pair differs from the other only by the MSB. In FIG. 5(a), numerals 211, 212, and 213 denote input terminals corresponding respectively to $B_1$, $B_2$ and $B_3$, shown in FIG. 6, just as outputs 221, 222 and 223 correspond to these binary codes. Reference numeral 201 designates a gate adapted to emit "1" at an output 231 and 0 at an output 232 only when its outputs 212 and 213 are both at logic value 0. Reference numeral 202 designates an AND gate; 203, an exclusive-OR gate; 204, a one-bit shift register; 205 and 205', AND gates; and 205'', and OR gate. The shift register 204 is operated by clock pulses having a repetition rate identical to that of the input signals. When both the inputs 212 and 213 are 0, the input signal corresponds to symbol $S_0$ or $S_4$, and so this is not differentially coded. In case of symbols other than symbols $S_0$ and $S_4$, the gates 202 and 205 are opened because the output 232 is 1, and also the gate 205' is closed because the output 231 is 0, and as a whole they form a differential coder for $B_1$ (MSB). Similarly, in FIG. 5(b) inputs 321, 322 and 323 correspond to $B_1$, $B_2$ and $B_3$, respectively, in FIG. 6, just as outputs 311, 312 and 313 correspond to these codes, and reference numeral 301 designates a gate adapted to emit 1 at an output 331 and 0 at an output 332 only when its input 322 and 323 are both 0. Reference numeral 302 designates an AND gate; 303, an exclusive-OR gate; 304, a one-bit shift register; 305 and 305', AND gates, and 305'', an OR gate. Except for the case where the inputs 322 and 323 are both 0, the input signals are differentially decoded. In case of symbols other than symbols $S_0$ and $S_4$, since the output 331 is 0 and the output 332 is 1, the gate 305 is closed, the gate 305' is opened, and the gate 302 is also opened, so that as a whole they form a differential decoder for $B_1$ (MSB).

Advantages of the present invention are as follows:
1. Effective means for resolving problems if given to the date transmission system using partial response shaping, in which correct transmission is impossible on the conventional transmission paths having the possibility of polarity inversion. Moreover, although a method for detecting transmission path code errors on the receiver side by making use of a redundancy in coding has been thought of in conventional data transmission systems ("Error Detection for Partial Response Systems" by J. F. Gunn and J. A. Lombardi, ICC '69 Record 69CP402-COM, pp. 46—1~46–4), it is known that the polarity inversion on the transmission path cannot be detected by such method of detection.

2. Since only MSB is differentially coded and decoded, only one memory element for each of transmitter and receiver is required regardless of the value of N. Also, the necessary associated logic circuit is of small scale.

3. The advantages inherent to the partial response shaping are not lost at all.

An example showing input and output signals of the circuits of FIGS. 5a and 5b wherein the code error problem due to the polarity inversion is eliminated is shown in Tables 1 and 2, respectively:

TABLE 1

| INPUT SYMBOL | | $S_0$ | $S_2$ | $S_6$ | $S_7$ | $S'_0$ | $S_5$ | $S_3$ | $S_4$ | $S_1$ | $S_0$ | $S_4$ | $S_7$ | $S_2$ |
|---|---|---|---|---|---|---|---|---|---|---|---|---|---|---|
| | B1 | 0 | 0 | 1 | 1 | 0 | 1 | 0 | 1 | 0 | 0 | 1 | 1 | 0 |
| | B2 | 0 | 1 | 1 | 1 | 0 | 0 | 0 | 0 | 1 | 0 | 0 | 1 | 1 |
| | B3 | 0 | 0 | 0 | 1 | 0 | 1 | 1 | 0 | 1 | 0 | 0 | 1 | 0 |
| REGISTER 204 OUTPUT | $O_{(1)}$ | 0 | 0 | 1 | | 0 | 0 | 1 | 1 | 1 | 1 | 1 | 1 | 0 |
| GATE 202 / GATE 205 | Close | | Open | | Close | | Open | | Close | | Open | | Close | | Open |
| GATE 205' | Open | | Close | | Open | | Close | | Open | | Close | | Open | | Close |
| | 221 | 0 | 0 | 1 | 0 | 0 | 1 | 1 | 1 | 1 | 0 | 1 | 0 | 0 |
| OUTPUT | 222 | 0 | 1 | 1 | 1 | 0 | 0 | 0 | 0 | 1 | 0 | 0 | 1 | 1 |
| | 223 | 0 | 0 | 0 | 1 | 0 | 1 | 1 | 0 | 1 | 0 | 0 | 1 | 0 |
| OUTPUT SYMBOL | | $S_0$ | $S_2$ | $S_6$ | $S_1$ | $S_0$ | $S_5$ | $S_5$ | $S_4$ | $S_7$ | $S_0$ | $S_4$ | $S_1$ | $S_2$ |

(1)The initial state is assumed to be "0".

TABLE 2

| RECEIVED SYMBOL[2] | | $S_0$ | $S_6$ | $S_2$ | $S_7$ | $S_0$ | $S_3$ | $S_3$ | $S_4$ | $S_1$ | $S_0$ | $S_4$ | $S_7$ | $S_6$ |
|---|---|---|---|---|---|---|---|---|---|---|---|---|---|---|
| | 321 | 0 | 1 | 0 | 1 | 0 | 0 | 0 | 1 | 0 | 0 | 1 | 1 | 1 |
| INPUT | 322 | 0 | 1 | 1 | 1 | 0 | 0 | 0 | 0 | 1 | 0 | 0 | 1 | 1 |
| | 323 | 0 | 0 | 0 | 1 | 0 | 1 | 1 | 0 | 1 | 0 | 0 | 1 | 0 |
| REGISTER 304 OUTPUT | $O_{(1)}$ | 0 | 1 | 0 | 1 | 1 | 0 | 0 | 0 | 0 | 0 | 0 | 0 | 1 |
| GATE 305 | Open | | Close | | Open | | Close | | Open | | Close | | Open | | Close |
| GATE 305' / GATE 302 | Close | | Open | | Close | | Open | | Close | | Open | | Close | | Open |
| | 311 | 0 | 1 | 1 | 1 | 0 | 1 | 0 | 1 | 0 | 0 | 1 | 1 | 0 |
| OUTPUT | 312 | 0 | 1 | 0 | 1 | 0 | 0 | 0 | 0 | 1 | 0 | 0 | 1 | 1 |
| | 313 | 0 | 0 | 1 | 1 | 0 | 1 | 1 | 0 | 1 | 0 | 0 | 1 | 0 |
| OUTPUT SYMBOL | | $S_0$ | [3]$S_6$ | $S_6$ | $S_7$ | $S_0$ | $S_5$ | $S_3$ | $S_4$ | $S_1$ | $S_0$ | $S_4$ | $S_7$ | $S_2$ |

(1)The initial state is assumed to be "0".
(2)These symbols are decoded outputs of the partial response decoder for the received signal affected the polarity inversion.
(3)This is an initial error depending on the initial state of register 304. The remaining output symbols are identical to the input symbols shown in Table 1.

What is claimed is:

1. A multilevel code transmission system for transmission of a data signal in the form of a 2N-1 level code signal based on a partial response shaping, where N is an integer greater than two, comprising:
a transmitter including
means for providing said data signal in the form of parallel binary codes;
means for monitoring each pair of input parallel binary codes representing N-$i$ and $i$ levels, where $i$ represents all positive integers smaller than N of said N-level code signal, wherein each pair of input parallel binary codes is so arranged that only the most significant bit is different from each other and the remaining bits are represented by the same binary codes;
means for delivering an output parallel binary code representing $i$ level when the level monitored by said monitoring means is N-$i$ or $i$ and the most significant bit last monitored by said monitoring means is a binary one, and for delivering another output parallel binary code representing N-$i$ level when the level monitored by said monitoring means is N-$i$ or $i$ and the most significant bit last monitored by said monitoring means is a binary zero;
means for converting the outputs of said delivering means to said 2N-1 level code signal based on the partial response shaping, said converting means including an adder for carrying out modulo-N addition between the outputs of said delivering means and a delayed signal, a delay circuit for delaying the output of said adder by twice the clock time period for data transmission to deliver said delayed signal, and a subtractor for subtracting said delayed signal from the output of said adder to deliver said 2N-1 level code signal; and means for amplitude modulating said 2N-1 level code signal thereby to transmit the modulated signal to a receiver;

and a receiver including means for applying a coherent demodulation to said transmitted modulated signal thereby to deliver discriminated parallel binary codes;

means for carrying out modulo-N addition between said discriminated parallel binary codes and said N, thereby to regenerate said output parallel binary codes;

means for monitoring each pair of said regenerated input parallel binary codes; and means for regenerating one of said parallel binary codes which represents $i$-level when the level monitored by the last mentioned monitoring means is N-$i$ or $i$ and is equal to the N-$i$ or $i$ level last monitored by the last mentioned monitoring means, and for regenerating another of said input parallel binary codes which represents N-$i$ level when the level monitored by the last mentioned means is N-$i$ or $i$ and is different from the N-$i$ or $i$ level last monitored by said last mentioned monitoring means, thereby to regenerate said data signal in the form of parallel binary codes.

2. A multilevel code transmission system as recited in claim 1, wherein said monitoring means in said transmitter includes means for detecting the binary code representing the 0 level if N is an odd number and detecting the binary code representing the 0 and N/2 levels if N is an even number, and said delivering means in said transmitter includes selector means responsive to said detecting means for delivering the input most significant bit as the output most significant bit when the binary code representing the 0 or N/2 levels is detected.

3. A multilevel code transmission system as recited in claim 2, wherein said monitoring means in said receiver includes means for detecting the binary code representing the 0 level if N is an odd number and detecting the binary code representing the 0 and N/2 levels if N is an even number, and said delivering means in said receiver includes selector means responsive to said detecting means for delivering the input most significant bit as the output most significant bit when the binary code representing the 0 or N/2 levels is detected.

4. A multilevel code transmission system as recited in claim 3, wherein said delivering means in said transmitter includes an exclusive OR circuit having two inputs and an output, the output of said exclusive OR circuit being connected to said selector means and one input of said exclusive OR circuit being connected to receive the input most significant bit of a binary code representing levels other than the 0 or N/2 levels, and a one bit memory device connected between the output and the other input of said exclusive OR circuit.

5. A multilevel code transmission system as recited in claim 4, wherein said delivering means in said receiver includes a one bit memory device connected to a selector means to receive the input most significant bit of a binary code representing levels other than the 0 or N/2 levels or the bit currently stored in said memory device if a binary code representing the 0 or N/2 levels is monitoring by said detecting means, and an exclusive OR circuit having two inputs and an output, the output of said exclusive OR circuit being the most significant bit of the output binary code, one input of said exclusive OR circuit being connected to receive the input most significant bit and the other input of said exclusive OR circuit being connected to said memory device when a binary code representing levels other than the 0 or N/2 levels is detected by said monitoring means.

6. In a multilevel code transmission system for transmission of a data signal in the form of a 2N—1 level code signal based on a partial response shaping, where N is an integer greater than two, a transmitter comprising:

means for providing said data signal in the form of parallel binary codes;

means for monitoring each pair of input parallel binary codes representing N-$i$ and $i$ levels, where $i$ represents all positive integers smaller than N of said N-level code signal, wherein each pair of input parallel binary codes is so arranged that only the most significant bit is different from each other and the remaining bits are represented by the same binary codes;

means for delivering an output parallel binary code representing $i$ level when the level monitored by said monitoring means is N-$i$ or $i$ and the most significant bit last monitored by said monitoring means is a binary one, and for delivering another output parallel binary code representing N-$i$ level when the level monitored by said monitoring means is N-$i$ or $i$ and the most significant bit last monitored by said monitoring means is a binary zero;

means for converting a part of the input parallel binary codes and the outputs of said delivering means to said N-level code signal based on the partial response shaping, said converting means including an adder for carrying out modulo-N addition between the outputs of said delivering means and a delayed signal, a delay circuit for delaying the output of said adder by twice the clock time period for data transmission to deliver said delayed signal, and a subtractor for subtracting said delayed signal from the output of said adder to deliver said 2N-1 level code signal; and means for amplitude-modulating said N-level code signal thereby to transmit the modulated signal to a receiver.

7. A transmitter as recited in claim 6, wherein said monitoring means includes means for detecting the binary code representing the 0 level if N is an odd number and detecting the binary code representing the 0 and N/2 levels if N is an even number, and said delivering means in said transmitter includes selector means responsive to said detecting means for delivering the input most significant bit as the output most significant bit when the binary code representing the 0 or N/2 levels is detected.

8. A transmitter as recited in claim 7, wherein said delivering means includes an exclusive OR circuit having two inputs and an output, the output of said exclusive OR circuit being connected to said selector means and one input of said exclusive OR circuit being connected to receive the input most significant bit of a binary code representing levels other than the 0 or N/2 levels, and a one bit memory device connected between the output and the other input of said exclusive OR circuit.

9. In a multilevel code transmission system for transmission of a data signal in the form of a 2N—1 level code signal based on a partial response shaping, where N is an integer greater than two, a receiver comprising:
- means for applying a coherent demodulation to a transmitted modulated signal thereby to deliver discriminated parallel binary codes;
- means for carrying out modulo-N addition between said discriminating parallel binary codes and said N, thereby to regenerate output binary codes;
- means for monitoring each pair of said regenerated output parallel binary codes; and
- means for regenerating an input parallel binary code representing $i$-level when the level monitored by the monitoring means is $N-i$ or $i$ and is equal to the $N-i$ or $i$ level last monitored by the monitoring means, and for regenerating another input parallel binary code representing $N-i$ level when the level monitored by the monitoring means is $N-i$ or $i$ and is different from the $N-i$ or $i$ level last monitored by said monitoring means, thereby to regenerate said data signal in the form of parallel binary codes.

10. A receiver as recited in claim 9, wherein said monitoring means includes means for detecting the binary code representing the 0 level if N is an odd number and detecting the binary code representing the 0 and N/2 levels if N is an even number, and said delivering means in said receiver includes selector means responsive to said detecting means for delivering the input most significant bit as the output most significant bit when the binary code representing the 0 or N/2 levels is detected.

11. A receiver as recited in claim 10, wherein said delivering means includes a one bit memory device connected to a selector means to receive the input most significant bit of a binary code representing levels other than the 0 or N/2 levels or the bit currently stored in said memory device if a binary code representing the 0 or N/2 levels is detected by said monitoring means, and an exclusive OR circuit having two inputs and an output, the output of said exclusive OR circuit being the most significant bit of the output binary code, one input of said exclusive OR circuit being connected to receive the input most significant bit and the other input of said exclusive OR circuit being connected to said memory device when a binary code representing levels other than the 0 or N/2 levels is detected by said monitoring means.

* * * * *

UNITED STATES PATENT AND TRADEMARK OFFICE
CERTIFICATE OF CORRECTION

PATENT NO. : 3,947,767
DATED : March 30, 1976
INVENTOR(S) : Shinichi Koike et al It is certified that error appears in the above-identified patent and that said Letters Patent are hereby corrected as shown below:

Col. 1, line 21 - delete "of" insert --on--
      line 26 - after "further" insert --subjected to--
      line 33 - delete "symvol" insert --symbol--

Col. 2, line 5 - delete "O" (letter) insert --0-- (numeral)
      line 9 - delete "lelvel" insert --level--
      line 15 - delete "symbbols" insert --symbols--
      line 27 - delete "occuur" insert --occur--

Col. 3, line 17 - delete "operaion" insert --operation--
      line 45 - delete "FIG. 3" insert --FIG.3(a)--
      line 62 - delete "neither" insert --either--

Col. 4, line 10 - delete "nately" insert --nitely--
      lines 17-18 - after "$S_{N/2}$" and before "inversion," insert --are not mistaken even upon occurrence of polarity--
      line 34 - insert quotes around 0 (zero)
      line 35 - delete "outputs" insert --inputs--
      line 38 - delete "and" (third occurrence) insert --an--
      line 42 - after "and so" insert --this symbol--
      line 66 - delete "date" insert --data--

Col. 5 - Table 1 - after "Reg. 204 Output" delete "$O_{(1)}$" (letter) insert --$0_{(1)}$-- (numeral)

Table 2 - after "affected" in footnote (2), insert --by--

UNITED STATES PATENT AND TRADEMARK OFFICE
CERTIFICATE OF CORRECTION

PATENT NO. : 3,947,767
DATED : March 30, 1976
INVENTOR(S) : Shinichi Koike et al It is certified that error appears in the above-identified patent and that said Letters Patent are hereby corrected as shown below:

Col. 7, line 22 - after "mentioned" insert --monitoring--
       line 65 - delete "monitoring" insert --detected--
       line 65 - delete "detecting" insert --monitoring--

Col. 9, line 6 - delete "discriminating" insert --discriminated--

Signed and Sealed this

Twentieth Day of July 1976

[SEAL]

Attest:

RUTH C. MASON
*Attesting Officer*

C. MARSHALL DANN
*Commissioner of Patents and Trademarks*